United States Patent [19] [11] 3,889,190
Palmer [45] June 10, 1975

[54] COMMUNICATIONS TRANSCEIVER ADAPTED FOR MOUNTING ON A HELMET

[76] Inventor: Charles Palmer, 1370 N.E. 171st St., North Miami Beach, Fla. 33162

[22] Filed: June 18, 1974

[21] Appl. No.: 480,470

[52] U.S. Cl. ............... 325/16; 179/156 A; 325/118
[51] Int. Cl. ............................................. H04b 1/38
[58] Field of Search ............ 325/16, 310, 312, 102, 325/111, 112, 118, 354; 343/718, 720; 2/185 R; 179/156 R, 156 A

[56] References Cited

UNITED STATES PATENTS

| | | | |
|---|---|---|---|
| 1,085,916 | 2/1914 | Hutchison | 179/156 A |
| 3,258,534 | 6/1966 | Goldsworthy | 179/156 A |
| 3,471,642 | 10/1969 | Beguin | 325/16 |

FOREIGN PATENTS OR APPLICATIONS

| | | | |
|---|---|---|---|
| 360,932 | 7/1938 | Italy | 325/16 |

*Primary Examiner*—George H. Libman

[57] ABSTRACT

A transceiver is mounted at an end of a tubular rod, the other end of which is pivotally mounted to a helmet above the wearer's ear. An earphone is mounted on the rod adjacent the wearer's ear and the rod is bent so the transceiver, which contains a microphone, is in front of the wearer's mouth. An antenna extends from the transceiver to a position above the helmet. The pivotal mount allows the rod to be positioned above the wearer's head when the transceiver is not in use.

3 Claims, 6 Drawing Figures

COMMUNICATIONS TRANSCEIVER ADAPTED FOR MOUNTING ON A HELMET

BACKGROUND AND SUMMARY OF THE INVENTION

This invention relates generally to communications equipment and more specifically to a novel transceiver communications device adapted to be detachably attached to a helmet type of a headgear for use in a hands-free manner by an individual wearing the headgear and which may be readily swung between an operative position for use and an inoperative position out of the way of the individual wearing the headgear.

In the construction industry it is normal that in the use of heavy machinery that it is quite difficult for workers to communicate with each other over even short distances, such as communications between a worker driving the machinery and a worker positioned a distance from the machinery and attempting to guide the function of the machinery so that a system of hand signals is normally required between such workers, this requiring that the worker driving the equipment always maintain continuous visual contact with the worker guiding the equipment in order to be aware of any change of hand signals and directions thus posing a hazard in that the driver of the equipment cannot pay full attention to the job of driving.

It would thus be desirable to provide a communications system readily usable by construction workers without affecting their job functions and in a manner increasing the ease of communication between such workers.

It is feature of the present invention to provide a communications transceiver adapted to be detachably attached to a helmet type of headgear and which is of a construction permitting use of the transceiver without requiring an individual to hold the transceiver in the individual's hands or the like thus permitting the individual to continue performing his normal duties while conversing with other workers over the transceiver.

A further feature of the present invention provides a communications transceiver adapted to be detachably attached to a helmet type of headgear and wherein the transceiver is mounted on a bracket pivotally secured to the headgear by a detachable clamp such that the microphone and earphone of the transceiver are positioned for proper use in close proximity to the user's mouth and ear respectively, and whereby the transceiver is pivotally supported on the bracket such that the same may be swung to a position disposed above the headgear so as to not interfere with a person's normal duties when the transceiver is not in use.

Among further features and advantages of the present invention is the provision of a communications transceiver adapted for detachable mounting on a helmet type of headgear and which is of a rugged and durable construction and which therefore may be guaranteed by the manufacturer to withstand rough construction site type of usage; one which is easy to use and reliable and efficient in operation; one which is readily attached to construction helmets and the like of various brands, sizes and configurations in an easy and efficient manner; one which is relatively simple in its construction and which may therefore be readily manufactured at a relatively low cost and by readily available manufacturing methods; and one which is otherwise well adapted to perform the services required of it.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same.

DESCRIPTION OF THE PREFERRED EMBODIMENT

Figure 1:
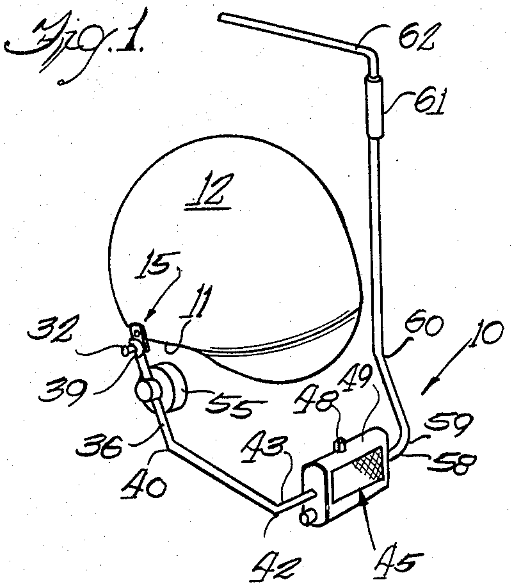
FIG. 1 is a perspective view of a helmet type of headgear having the communications transceiver of the present invention attached thereto.
Figure 2:
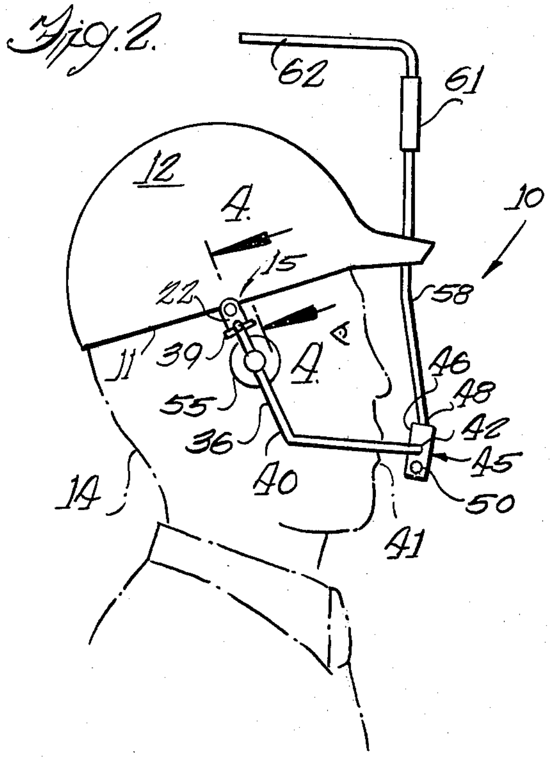
FIG. 2 is a side elevational view of the communications transceiver of the present invention attached to the side edge of a helmet as seen on an individual's head in the operative position.

Referring now to the drawings in detail there is illustrated a preferred form of a communications transceiver device adapted for mounting on helmet type of headgear, such as the conventional hardhat construction worker helmet, and which is constructed in accordance with the principles of the present invention and is designated generally in its entirety by the reference numeral 10. The device is shown detachably attached about a bottom side edge 11 of the conventional helmet 12 in a position which will overlie an ear of an individual wearing the helmet, such as individual 14.

The device 10 is detachably attached to the helmet 12 by a clamp mechanism generally designated by reference numeral 15 and which is comprised of a pair of substantially identical clamp members 21 and 22 having associated interior surfaces 23 and 24 with the interior surfaces disposed in confronting relationship and spaced apart and with each interior surface having a layer of resilient padding 25 affixed thereto, the spacing between the layers of padding adapted to receive therebetween the thickness of helmet 12 about bottom edge 11. A rivet 26 is provided which extends through both of the clamping members 21 and 22 approximately centrally thereof to retain the respective positions of the clamp members 21 and 22 relative to each other while simultaneously providing a pivot axis therefor in a manner that spreading bottom ends 27 of each of the clamp members away from each other will effect the simultaneous inward movement of top ends 28 of each of the clamp members toward each other in a manner to tightly clamp the helmet 12 between the top end portions of the clamp members. To effect this spreading movement of ends 27 there is affixed to interior surface 23 of clamp member 21 adjacent end 27 the end of a threaded shaft 30 which is journaled thereto and which extends outwardly therefrom to be threadedly received in a threaded aperture 31 provided in clamp member 22 adjacent associated end 27, the shaft extending therethrough a substantial distance and terminating with a flattened head portion 32 adapted to be gripped between the thumb and index finger of an individual's hand in a manner to effect the rotation of the shaft about its axis, the rotation of the shaft in one direction driving the clamp member ends 27 away from each other with rotation of the shaft in the opposite direction pulling the clamp member ends 27 toward each other, such movements effecting the clamping and unclamping forces of ends 28 on helmet 12.

The shaft 30 acts as a pivot support for end 35 of a tubular rod 36 with the end 35 being provided with a bore 37 extending therethrough which is received on the pivot shank 30. A compression spring 38 is disposed concentrically about shank 30 intermediate the exterior surface of clamp member 22 in the adjacentmost surface of tubular end 35. A wing nut 39 is threadedly mounted on shaft 30 intermediate shaft head portion 32 and the adjacentmost surface of tubular end 35 in a manner fastening the tubular rod 36 to the shaft 30 and yieldingly maintaining the tubular rod in any desirable pivoted position relative to the shaft.

The tubular rod 36 extends downwardly and forwardly at a slightly oblique angle and is bent such as designated by reference numeral 40 so as to extend along approximately a horizontal line even with the mouth 41 of the individual 14 wearing the helmet 12. The forwardmost end 42 is bent in a direction normal to the plane of the rod 36 to define a tubular rod support 43 which has supported thereon in a position immediately in front of the individual's mouth 41 a conventional type of solid state transceiver 45. The transceiver 45 includes a front surface 46 disposed adjacent individual's mouth 41 and containing a microphone 47 therein. An on-off type of electrical control switch 48 is provided on the top surface 49 of the transceiver, and a channel selection knob 50 is rotatably supported on a shaft extending through a side surface 51 of the transceiver and is operable in a manner to select one of a plurality of desired transmitting and receiving channels such that a plurality of transceivers may be operated within a limited area in a manner permitting the carrying on of a plurality of independent conversations which in no way interfere with each other.

It is to be understood that the transceiver is preferably of a conventional citizen's band combined transmitter and receiver apparatus using transistors, integrated circuits, or other solid-state devices and wherein the components thereof are provided with a conventional multi-pole relay such that the components of the receiver may also be used as a transmitting circuit upon energization of appropriate relays. In order to permit a hands-free operation of the transceiver it is to be understood that energization thereof would be accomplished through the use of a voice activated relay system involving a circuit free amplifier that amplifies the input microphone signal and then rectifies the signal to form a direct current voltage that is a function of the input sound level and fluctuates therewith, this voltage signal being used in conjunction with a power transistor to energize the control relay to switch the transceiver between a normal receive mode of operation and a transmitting mode of operation when an individual is speaking thereinto. It is to be further understood that a sensitivity potentiometer may be included in the circuit to adjust the sensitivity of the voice activated relay system to minimize the chances of accidental energization of the system due to the noise of heavy construction equipment. Further, a conventional type of squelch circuit may be included in the circuits to eliminate background noise while in the receiver mode of standby operation.

The transceiver 45 is connected by suitable electrical wiring which extends through tubular rod 36 and terminates at an earphone 55 mounted on the rod at a position thereon adjacent the individual's ear.

Projecting out of the opposite side surface 57 of the transceiver 45 is a tubular antenna rod 58 which projects horizontally outwardly therefrom and is then bent at 59 in a direction inclined upwardly and toward the helmet, and which is then further bent at 60 in a vertical direction terminating at a coil housing 61 which contains a conventional type of tuning coil or the like, with the opposite end of the coil housing being connected to an antenna rod 62 which projects in a horizontal ground plane disposed over the top of the helmet 12 when the transceiver is in the normal operative position disposed in front of the mouth 41 of the individual 14.

Figures 3, 4, 5, 6:
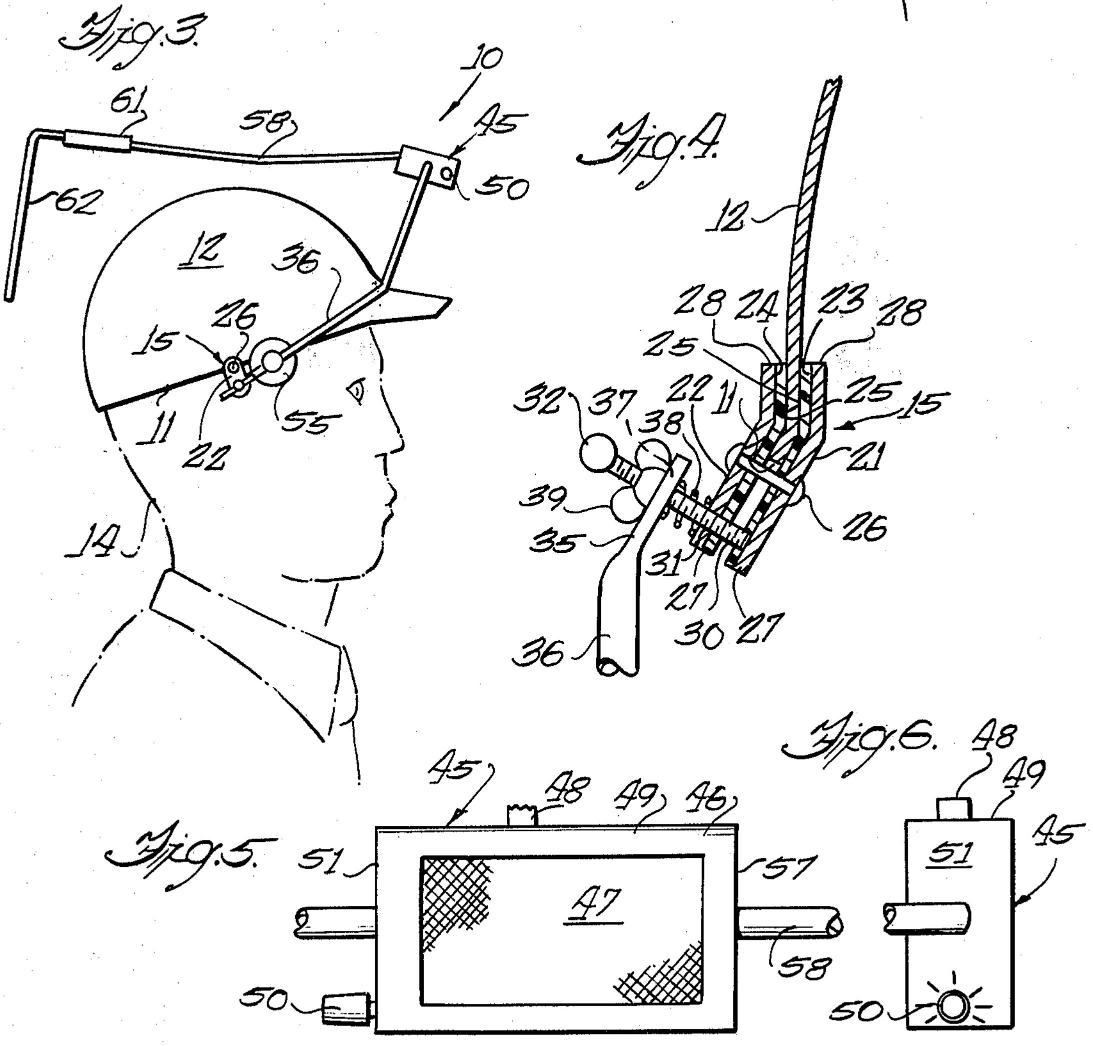
FIG. 3 is a side elevational view similar to FIG. 2 but with the communications transceiver device swung into an inoperative position above the level of the headgear.
FIG. 4 is an enlarged cross-sectional view taken along line 4—4 of FIG. 2 showing the clamp device.
FIG. 5 is an enlarged front elevational view of the communications transceiver.
FIG. 6 is a side elevational view of the communications transceiver.

In operation, an individual clamps the communications transceiver device 10 to the construction helmet 12 by use of the clamp mechanism 15 in the manner as aforedescribed, the individual then placing the helmet 12 on his head in a manner to obtain the benefits thereof as a head protective covering as is normally required on a construction site. Should the individual not desire to use the transceiver 45, he merely pushes upwardly on the transceiver device in a manner to swing the supporting tubular rod 36 upwardly about shaft 30 to position the transceiver in a non-use position as shown in FIG. 3 wherein the transceiver and associated supporting rods and the like are disposed above the level of the helmet 12. When the individual wishes to use the transceiver device 45 for conversing with other individuals on the construction site remote from the position of the individual, or even those individuals out of visible sight which he could not hand signal to such individuals, then the individual merely swings the tubular rod 36 in a downward direction about shaft 30 to place the transceiver device 45 in front of the individual's mouth. The individual then turns on the transceiver by operation of switch 48, selects a desired channel by use of channel selector knob 50, and then need merely speak into the microphone 47 without needing his hands or the like so that the individual may be carrying out the normal course of work without any interference thereto by the device 10.

There is thus provided by the present invention a communication transceiver device 10 adapted for detachably mounting on a helmet type of headgear 12 and which lends itself to permitting an individual to have a transceiver device 45 readily at hand at all times when desired in a manner without interfering with the normal work duties of the individual when the transceiver is not in use. Further, since the transceiver device 10 is completely supported on the helmet 12, a person wearing the helmet is free to continue carrying out his regular duties while conversing over the transceiver without detracting from the use of the transceiver or from his duties and without requiring the use of hands or the like to continually switch between the transmit and receive mode of operations of the transceiver as the same are automatically performed by a voice activated relay system in the transceiver circuit.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A communications transceiver apparatus adapted for mounting on a helmet type of headgear comprising a clamp mechanism adapted to be detachably attached to a bottom side edge of said helmet in a position normally overlying an individual's ear when the helmet is worn by the individual; tubular rod having one end pivotally attached to said clamp mechanism with the opposite end projecting downwardly and outwardly therefrom to a position substantially below and in front of said helmet adjacent an individual's mouth; means adjustably selecting the position of said tubular rod about said clamp mechanism; a transceiver device mounted on said terminal end of said tubular rod in a position substantially in front of an individual's mouth, said transceiver including a control switch projecting from a surface thereof and adapted to activate and deactivate said transceiver; said transceiver including a channel selector knob projecting from a surface thereof and adapted to be operated by an individual to select one of a plurality number of available channels for the transmitting and receiving of communications on the transceiver device; an earphone mounted on said tubular rod in close proximity to said clamp mechanism and in position to overlie an adjacent individual's ear; electrical conducting means interconnecting said earphone and said transceiver device; an elongated antenna rod having one end projecting outwardly of a side surface of said transceiver device, said antenna rod projecting from said transceiver device in a direction upwardly and rearwardly toward said helmet and terminating in a position spaced above said helmet; a coil housing affixed to said terminal end of said antenna rod an in electrical connection therewith; and a second antenna rod having one end affixed to the opposite end of said coil housing with the second antenna rod projecting outwardly therefrom in a generally horizontal direction to overlie said top of said helmet when said transceiver device is in position in front of said individual's mouth.

2. The apparatus as set forth in claim 1 wherein said clamp mechanism comprises a first clamp member and a second clamp member, said first clamp member spaced outwardly from said second clamp member with each clamp member having a top end portion and a bottom end portion, rivet means interconnecting said first and second clamp members approximately centrally thereof and providing a general pivot axis thereabout, said clamp members adapted to receive intermediate said top end portions thereof a bottom edge portion of said helmet, a threaded shaft having one end journaled for rotation in an interior surface of said first clamp member with the shaft extending outwardly therefrom and threadedly received in a threaded opening provided in said bottom end portion of said second clamp member, rotation of said shaft in one direction about its axis effecting the outward movement of said clamp member bottom end portions relative to each other in a manner to effect pivotal movement of said rivet pin in a manner to move said top end portions inwardly relative to each other in a clamping movement, rotation of said shaft in the opposite direction about its axis effecting the inward movement of said clamp member bottom end portions relative to each other thus effecting the simultaneous pivotal movement of said clamp members about said rivet pin in a manner to move said clamp member top end portions outwardly relative to each other in an unclamping movement, and means affixed to the projecting end of said shaft adapted to be grasped between the fingers of an individual's hand to effect the selected rotative movement of the shaft in a selected direction about its axis.

3. The apparatus as set forth in claim 1 wherein said means pivotally mounting one end of said tubular rod to said clamp mechanism comprises a bore extending through said one end of said tubular rod member, said bore being received on said shaft in a position intermediate said second clamping member and said enlarged head portion mounted on the terminal end of said shaft, compression spring interposed between said second clamp member and said adjacent surface of said tubular rod member, and a wing nut threadedly received on said shaft intermediate said terminal end portion and said opposite side surface of said tubular rod end, the rotation of said wing nut about said shaft effecting the compression of said spring as said tubular rod end is forced inwardly in the direction of said second clamp member to thus retain said rod member in a desired angular position relative to said clamp mechanism.

* * * * *